Dec. 3, 1968     L. V. MALDARELLI     3,413,903

HIGH SPEED PLATEN

Filed Jan. 24, 1966

INVENTOR.

BY.

GOLOVE & KLEINBERG,
ATTORNEYS.

United States Patent Office 3,413,903
Patented Dec. 3, 1968

3,413,903
HIGH SPEED PLATEN
Lawrence Vincent Maldarelli, Duarte, Calif., assignor to Hycon Manufacturing Co., Monrovia, Calif.
Filed Jan. 24, 1966, Ser. No. 522,473
2 Claims. (Cl. 95—11)

ABSTRACT OF THE DISCLOSURE

A camera platen is provided with a plurality of openings communicating to a pressure chamber. A piston operating in the pressure chamber creates a vacuum at the surface of the platen, which subjects film next adjacent the platen to a pressure differential, conforming the film to the platen. Returning the piston toward the platen, the film is propelled away from the platen to enable high-speed transport of the film.

---

This invention relates to improvements in devices for the capture and release of transported webs, and more particularly to a device over which a movable web is free to be transported in close proximity to a platen surface and for intermittently capturing and releasing progressive portions of the web.

In image and other data recording and duplicating systems, it is often necessary to record a grouping of related data on a confined segment of a transported web. In such a case, each portion of the web upon which the particular data grouping is to be produced must conform to a predetermined contour at a prescribed spatial location during the time when the data is transferred. Furthermore, it is often essential that this portion of the web be absolutely stationary during this time, after which another portion of the continuous web replaces the first in the spatial location within a prescribed interval of time.

Such systems of data recordation, in combination with devices which attempt to fulfill the above requirements with varying degrees of success, are being employed in a variety of applications. A familiar example is the cinematographic camera which records a series of images on sensitized film. Other notable examples are panoramic cameras employed for aerial surveillance, among other things; high speed photographic cameras; and printing systems. The foregoing examples are intended to be illustrative only, and are not to be considered as restrictive.

The difficulties of the prior art may be adequately illustrated by a consideration of the cinematographic camera, which functions to record a series of individual images which can later be reproduced, in sequence, on a viewing screen so that an illusion of motion is produced by the human eye. In order that the camera record this series of still photographs, each segment of film which is to be exposed must be momentarily stopped and held in position at the image plane during exposure. The duration which the film is stopped in position, or captured, must be long enough to permit adequate exposure but short enough to allow the film to advance a distance of one frame before the commencement of the next exposure interval. The cycle of capture, release and advancement of the film for a 24 frame per second projection rate obviously must be completed within 1/24th of a second. This cycle must be completed in correspondingly shorter times when higher speeds are desired.

The most commonly employed mechanism for the intermittent advancement of the film uses a claw device. The film is "pulled down" into position by the reciprocation of claws, which engage the sprocket perforations or holes of the film. The claws are retracted and the film is then "clamped" into position so that it may be exposed, this registration being accomplished either by pressure which is applied to the film by the gate, or by the insertion of register pins into the sprocket holes, immediately before exposure. This film is exposed during capture, after which the gate or the register pins must be disengaged from the film in order to allow the film to be transported.

Both the pressure gate and the register pin devices, used in conjunction with the mechanism for intermittently advancing the film, present conditions of high inertia which require relatively heavy duty operating mechanisms and relatively complex vibration and motion damping systems. The film itself may lose its registration or it may tear, particularly at the higher frame rates, if the advancing and capture mechanism imposes abnormal stresses about the sprocket holes.

The present invention avoids these difficulties of the prior art and provides a device over which the web is free to travel and upon which a predetermined segment of the web is captured in a prescribed spatial location with high speed. This invention further releases the web after exposure so that transport is facilitated.

According to the underlying concepts of the invention, a pressure differential between the two surfaces of the web may be established in order to create a relative vacuum adjacent to the surface which remains in proximity with the platen of the invention. When this relative vacuum is produced, a segment of the web corresponding to prescribed dimensions is rapidly drawn against the platen, thereby stopping this portion of the web and capturing it in a position which conforms to the contour of the platen. Termination of the relative vacuum results in a release of the segment, facilitating web transport. When the web has been transported a prescribed distance, re-establishment of the relative vacuum operates to capture another segment of the web.

A preferred embodiment of the invention includes a platen which contains a plurality of slits, the depth of these slits extending through the opposite surface of the platen. A substantially air impenetrable membrane of a flexible, elastic material is sealed along its edges to this back surface. A large disk member is located in the center area of the membrane, between the membrane and the back of the platen. Attached to the center of the disk is an actuating handle, which, when pulled away from the back of the platen, causes a flexure of the elasttic membrane. This flexure in turn causes a larger volume to exist between the back of the platen and the membrane, momentarily lowering the pressure in this expanded volume. If the slits are not blocked, as by a web segment, the pressure within this volume and the ambient pressure will tend to equalize, by the drawing of air through the slits in the platen.

If a web segment is placed over the front surface of the platen, the pressure differential created by a rapid movement of the actuating handle will cause the web to seal the slits and to flatten against the platen. Although leakage of air between the web and the platen will decrease the pressure differential, the web is held for a period sufficiently long to enable excitation or exposure. Any leakage of air into the expanded chamber necessarily increases the mass of air within the chamber, so that when the handle is released and the membrane returns to its original position, this additional air is expelled through the slits, providing a propulsive force to the web away from the platen. This return action releases the web from the platen to facilitate web transport.

In an alternative embodiment of the invention, the relative vacuum is produced by the action of a piston and cylinder arrangement attached to the rear surface of the platen.

The "front" surface of the platen which supports the web may be either flat or curved, or it may exhibit a combination of flat and curved surfaces, the selected contour depending upon the application involved. By way of example only, a curved platen would be desirable for use in combination with a panoramic camera.

Accordingly, it is an object of the invention to provide a device which rapidly captures a segment of a transported web.

It is a further object of the invention to provide a device which applies a differential pressure to a segment of a transported web to capture said segment against a platen included by said device.

It is a still further object of the invention to provide a device which includes a plurality of vacuum zones on the front surface of a platen which operate to intermittently capture a segment of a transported web.

It is also an object of the invention to provide a device which applies a relative vacuum to a segment of a transported web for intermittent capture without the necessity of an independent vacuum source.

It is a further object of the invention to provide a device which releases a captured segment of a transported web by the operation of fluid forces.

It is still a further object of the invention to provide a device which operates by fluid forces to intermittently stop segments of a transported web and to capture each such segment in a prescribed spatial location.

The novel features which are believed to be characteristic of the invention, together with further objects and advantages thereof, will be better understood from the following description considered in connection with the accompanying drawings in which two embodiments of the invention are illustrated by way of example.

It is to be expressly understood, however, that the drawings are for the purpose of illustration and description only, and are not intended as a definition of the limits of the invention.

Figure 1:
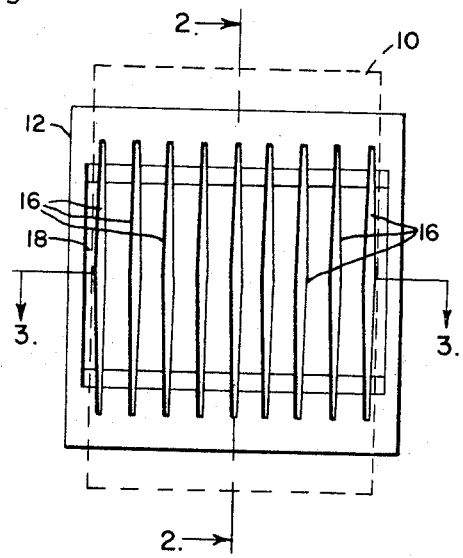
FIG. 1 is a view of the front surface of a preferred embodiment of the invention.
Figure 2:
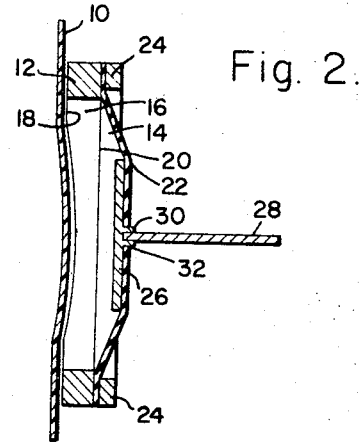
FIG. 2 is a side sectional view of a preferred embodiment of the invention, taken along the line 2—2 of FIG. 1 in the direction of the appended arrows.
Figure 3:
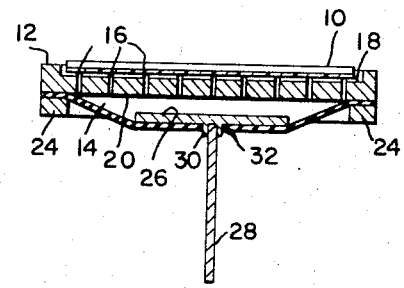
FIG. 3 is an end sectional view of the preferred embodiment of the invention, taken along the line 3—3 of FIG. 1.

With reference to the drawings, there is shown in FIGS. 1 through 3 a preferred embodiment of the invention, in conjunction with a transported web 10. A platen 12 is combined with a chamber 14 at the rear surface. A plurality of vacuum slits 16 connect the front surface 18 of the platen 12 with the vacuum chamber 14. The front surface 18 of the platen 12 is shown in FIGS. 1, 2 and 3 as being relatively flat in one direction and curved in an orthogonal direction. Obviously the invention also contemplates surfaces which may even have compound curves.

The slits 16 are generally narrow in relation to their length, and, as shown in FIG. 1, they are substantially parallel to each other, their length extending along a distance slightly shorter than the length of the platen 12.

Since the platen front surface 18 is shown as partially curved, it is desirable that the width of these slits 16 be varied according to the distance of respective positions on the curved surface 18 from the plane of the web position during transport so that the web contacts the entire surface substantially simultaneously.

As shown in FIGS. 2 and 3, the depth of the slits 16 extend to the back surface 20 of the platen and open into the chamber 14. This chamber 14 is bounded by the back surface 20 of the platen 12 and a membrane 22. The membrane 22 is preferably a flexible, elastic, substantially fluid impermeable material. The membrane 22 is sealed along its edges to the back surface 20 of the platen by means of a ring 24 having inside dimensions slightly larger than the area generated by the slits 16 on the back surface 20 of the platen 12. A large plate or disk 26 is located within the center area of the membrane 22 and the back surface of the platen. A shaft 28 is attached to the center of the disk 26 by a shaft connector 30, which extends through a hole 32 in the center of the membrane 22 and is sealed thereto.

In operation, a transported web 10 is placed over the front surface 18 of the platen 12 so that all of the slits 16 are covered. A rapid pulling backward of the shaft 28, which acts as an actuating handle, causes the moving backward of the large disk 26. This in turn causes flexure of the membrane 22, and a larger volume is made to exist between the membrane 22 and the back surface 20 of the platen 12. The accompanying decrease of pressure within this chamber 14 creates a pressure differential between the chamber pressure and the ambient pressure impinging on the opposite surface of the web 10, causing the web segment to be pressed against the front surface 18 of the platen, and conformed to the surface thereof. The web segment is thus captured at a prescribed spatial location along a predetermined contour. Furthermore, the web's transport at this location is stopped quite suddenly.

Leakage of air around the edges of the web into the slits 16 and thus into the expanded chamber 14, increases the mass of air in the chamber volume. Upon release of the shaft 28, allowing the membrane 22 to return to its original position, this additional air is expelled through the slits 16 with a propulsive force that releases the web from the platen to facilitate transport.

Figure 4:
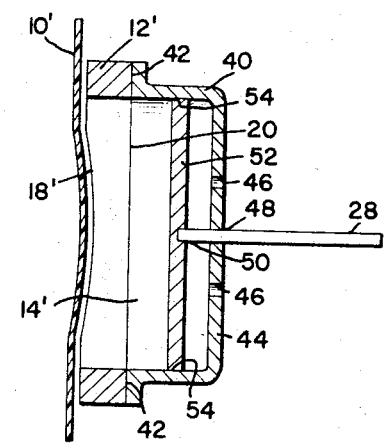
FIG. 4 is a side sectional view of an alternative embodiment of the invention.

Turning next to FIG. 4, there is shown an alternative embodiment of the invention. This alternative embodiment is similar to the preferred embodiment of FIGS. 1, 2 and 3 in that the platen structures are similar and both embodiments include slits. Accordingly, the elements of FIG. 4 that are substantially identical to elements of FIGS. 1 through 3 have been given primed reference numerals. The difference between the two embodiments is in the apparatus which is attached to the rear surface 20' of the platen 12' for creating and extinguishing the relative vacuum which acts on the web segment 10'.

With reference to FIG. 4, a cylinder type chamber 40 is attached to the rear surface 20' of the platen 12' at 42. The end 44 of the chamber 40 includes breathing apertures 46, and a centered aperture 48 to receive a shaft 28' which is attached by conventional means at junction 50 to a piston 52. The piston sides 54 are adapted to slide along the inside surface of the cylinder chamber 40 upon actuation of the shaft 28', causing an alternating increase and decrease of the chamber volume 14'.

It is clear that yet other devices can be utilized to create the pressure differential between the front and rear surfaces of the platen. The apparatus should be light, have little inertia and operate at high speeds with little or no shock or vibration.

It is to be understood that reference to air as the fluid medium is not to be deemed restrictive; and that the use of fluids other than air, both gaseous and liquid, is also encompassed within the scope of the invention.

Thus, there has been shown a fluid controlled platen for the spatial positioning, capture and release of transported webs. Other embodiments of the present invention and modifications of the embodiment herein presented may be developed, and variations in the operating procedures to be used with particular systems which include specific embodiments of the invention may be employed, without departing from the essential characteristics thereof. Accordingly, the invention should be limited only by the scope of the claims appended below.

What is claimed as new is:

1. In combination with a moving web having front and rear surfaces including means for transporting the web, means for intermittently capturing specific portions of the web at a predetermined spatial location along a prescribed contour, comprising:

(A) platen means having a front surface of the prescribed contour over which the rear surface of the web is free to be transported;

(B) fluid communication means coupled to said front surface of said platen means; and (C) differential pressure means connected to said fluid communication means having an expansion chamber in fluid tight communication with said platen means for creating a pressure differential between said platen means front surface and the web front surface, said differential pressure means including a cylindrical chamber having a piston located therein, said chamber being connected with a fluid tight seal to the rear surface of said platen means, said piston being adapted to connect to a source of reciprocating motion for rapidly changing the volume bounded by said rear surface of said platen means and said piston in order to modify the fluid pressure at said front surface of said platen means;

whereby, the mean pressure at said platen means front surface can be rapidly varied by actuation of said differential pressure means so that the mean pressure is alternatively much smaller and slightly greater than the ambient fluid pressure on the front surface of the web.

2. In a camera system including means for transporting film across the image plane thereof, means for intermittently capturing individual film frames, positioning each such frame in the image plane, holding, the frame in the image plane for a predetermined exposure interval and releasing the frame after exposure to facilitate film transport, comprising:

(A) platen means having a front surface adjacent to the path of film travel;

(B) fluid communication means opening onto said front surface of said platen means;

(C) variable volume chamber means connected to said fluid communication means, including a cylindrical chamber, said chamber being affixed by a fluid-tight seal to the rear surface of said platen means; and (D) means for rapidly varying the volume of said chamber means, creating a pressure differential between said platen means front surface and the surface of the film remote from said platen means, including a piston slidably mounted in said cylindrical chamber, said piston adapted to connect to a source of reciprocating motion, thereby allowing the volume bounded by said rear surface of said platen means and said piston to be varied in order to modify the fluid pressure at said front surface of said platen means;

whereby, the mean pressure at said platen means front surface is varied so that the mean pressure is alternatively much smaller and slightly greater than the ambient fluid pressure on the film surface remote from said platen means.

References Cited

UNITED STATES PATENTS 1,974,842 9/1934 Black _____ 95—12.5
2,788,724 4/1957 Weiss _____ 95—31

NORTON ANSHER, *Primary Examiner.*

C. E. SMITH, *Assistant Examiner.*